United States Patent
Della Pietra et al.

(10) Patent No.: US 11,986,122 B2
(45) Date of Patent: May 21, 2024

(54) PROCESS FOR IMPROVING THE UNIFORMITY OF CONCENTRATION OF ESPRESSO COFFEE IN AN ESPRESSO COFFEE MACHINE AND ASSOCIATED ESPRESSO COFFEE MACHINE

(71) Applicant: LA MARZOCCO S.R.L., Scarperia (IT)

(72) Inventors: Stefano Della Pietra, Scarperia (IT); Riccardo Gatti, Scarperia (IT)

(73) Assignee: LA MARZOCCO S.R.L., Scarperia (IT)

( * ) Notice: Subject to any disclaimer, the term of this patent is extended or adjusted under 35 U.S.C. 154(b) by 757 days.

(21) Appl. No.: 17/059,679

(22) PCT Filed: Jun. 7, 2019

(86) PCT No.: PCT/IB2019/054750
§ 371 (c)(1),
(2) Date: Nov. 30, 2020

(87) PCT Pub. No.: WO2019/234696
PCT Pub. Date: Dec. 12, 2019

(65) Prior Publication Data
US 2021/0204748 A1      Jul. 8, 2021

(30) Foreign Application Priority Data

Jun. 8, 2018   (IT) .................. 102018000006140

(51) Int. Cl.
*A47J 31/30*   (2006.01)
*A47J 31/52*   (2006.01)

(52) U.S. Cl.
CPC ......... *A47J 31/303* (2013.01); *A47J 31/5251* (2018.08)

(58) Field of Classification Search
CPC .......... A47J 31/30; A47J 31/303; A47J 31/32; A47J 31/34; A47J 31/36; A47J 31/44;
(Continued)

(56) References Cited

U.S. PATENT DOCUMENTS

| 10,925,434 B2 | 2/2021 | Vetterli |
| 2011/0097454 A1* | 4/2011 | Coccia ............... A47J 31/54 99/283 |

(Continued)

FOREIGN PATENT DOCUMENTS

| CA | 3008340 | 8/2017 |
| CN | 101094602 A | 12/2007 |

(Continued)

OTHER PUBLICATIONS

International Search Report for PCT/IB2019/054750, dated Aug. 13, 2019, 4 pages.

(Continued)

*Primary Examiner* — Hung D Nguyen
(74) *Attorney, Agent, or Firm* — NIXON & VANDERHYE P.C.

(57) ABSTRACT

A machine for the preparation and dispensing of espresso coffee comprises: a coffee boiler, a filter holder with a filter for a pressed coffee powder puck, and a pre-infusion chamber and a hydraulic circuit for transporting pressurized water from the coffee boiler to the pre-infusion chamber. The machine further comprises a device for detecting a parameter indicative of the filling of the pre-infusion chamber and of the hydraulic circuit so that the step of dispensing of an espresso coffee can be started on the basis of the detected filling parameter.

11 Claims, 9 Drawing Sheets

(58) Field of Classification Search
CPC .... A47J 31/4403; A47J 31/4485; A47J 31/46; A47J 31/465; A47J 31/467; A47J 31/469; A47J 31/52; A47J 31/5251; A47J 31/5253; A47J 31/5255; A47J 31/54; A47J 31/542; A47J 31/56
See application file for complete search history.

(56) References Cited

U.S. PATENT DOCUMENTS

| | | | |
|---|---|---|---|
| 2014/0137746 A1* | 5/2014 | Moran | A47J 31/44 99/280 |
| 2018/0255961 A1 | 9/2018 | Vetterli et al. | |

FOREIGN PATENT DOCUMENTS

| | | |
|---|---|---|
| CN | 106231965 A | 12/2016 |
| CN | 108024660 A | 8/2018 |
| EP | 0465877 A1 | 1/1992 |
| EP | 3 225 141 | 10/2017 |
| WO | 2008/114210 | 9/2008 |
| WO | WO 2011/055189 | 5/2011 |
| WO | 2011/140582 | 11/2011 |
| WO | 2 531 742 C2 | 10/2014 |
| WO | WO 2015/031828 | 3/2015 |
| WO | WO 2015/055343 | 4/2015 |
| WO | 2016/093920 | 6/2016 |
| WO | WO 2017/068021 | 4/2017 |
| WO | WO 2019/234696 | 12/2019 |

OTHER PUBLICATIONS

Written Opinion of the ISA for PCT/IB/2019/057750, dated Aug. 13, 2019, 5 pages.
Chinese Office Action dated May 7, 2022 issued in Chinese Patent Application No. 201980036859.9 and English translation, 19 pp.
Japanese Office Action dated Sep. 19, 2023 issued in Japanese Patent Application No. 2020-566963 and English translation, 17 pp.
Russian Search Report dated Sep. 7, 2022 issued in Russian Patent Application No. 2020140641, 2 pp.

* cited by examiner

PROCESS FOR IMPROVING THE UNIFORMITY OF CONCENTRATION OF ESPRESSO COFFEE IN AN ESPRESSO COFFEE MACHINE AND ASSOCIATED ESPRESSO COFFEE MACHINE

This application is the U.S. national phase of International Application No. PCT/IB2019/054750 filed 7 Jun. 2019, which designated the U.S. and claims priority to IT Patent Application No. 102018000006140 filed 8 Jun. 2018, the entire contents of each of which are hereby incorporated by reference.

BACKGROUND

The present invention relates to in general to the sector of espresso coffee machines. More particularly, it relates to a process and a machine able to dispense espresso coffee with a desired degree of concentration.

BACKGROUND ART

Many machines for the preparation of beverages are known. In particular, many machines for the preparation of espresso coffee from coffee powder, pods, capsules or the like are known.

Typically, in a machine for the preparation of espresso coffee, a high-pressure and high-temperature water flow is made to pass through a puck of ground coffee. In some known machines it is possible to regulate precisely the pressure and/or the temperature of the water which passes through the coffee puck. In some known machines, it is possible to modify the pressure and/or the temperature of the water during dispensing.

The aforementioned measures have been adopted by some coffee machine manufacturers in order to improve the quality of the beverage by attempting to extract from the ground coffee powder the substances and the essences more effectively. The aforementioned measures, along with others, have also been adopted in order to compensate, for example, for different coffee mixtures, different processing operations, different particle sizes and different degrees of compaction of the ground coffee, and different percentages of moisture.

In some cases, coffee machine manufacturers have also attempted to develop solutions which could lead to the preparation of coffee with the same characteristics.

At present, the machines for preparation of espresso coffee which dispense the beverages at a constant pressure start to calculate the volume or the mass of water used for the infusion (espresso coffee) from the moment the command to start the infusion is given by the user.

The same happens with machines which have a control unit in which different pressure profiles may be selected by the operator. The machine starts to reproduce the profile from the moment the command is given by the operator and interrupts it following the flow of a predetermined volume of water or mass of water or once the total time from the start of the infusion has lapsed.

WO 2011/140582 describes an improved method and apparatus for an espresso coffee machine. WO 2011/140582 envisages a module for changing the power of a pump, operationally associated with a pump. Preferably, the module for changing the pump power allows a pressure profile to be defined for the flow delivered by the pump. In embodiments, the module for changing the pump power may be used to obtain the pre-infusion. According to one aspect of the subject of WO 2011/140582, an espresso coffee machine comprising a module for changing the pump power for the pre-infusion is provided. In embodiments, the module for changing the pump power may be used to define the pressure profile during an espresso coffee production cycle. The pressure profile may be pre-set or configured by the user. More preferably, the pressure profile may assume the form of a power-time profile indicative of the electric power supplied to a respective pump. EP3225141 describes a coffee machine and an operating method.

SUMMARY OF THE INVENTION

The Applicant has realized that, at present, it is not possible to obtain an espresso coffee with a constant ratio as regards the amount of solvent (water) and solute (coffee powder), at least owing to the fact it is not possible to calculate with precision how much water is dispensed before the pre-infusion starts.

In fact, with a variation in the amount of coffee powder used and/or grinding fineness set by the user and/or the pressing performed by the user the volume of the empty space above the coffee powder puck varies. Consequently, there is a variation in the quantity of liquid which will be allocated to fill this empty space above the coffee puck before the pressurized hot water reaches the coffee puck.

In other words, part of the water supplied is used to fill the hydraulic circuit upstream of the filter holder and another part is used to fill the volume in the filter above the coffee powder puck. While the volume of the hydraulic circuit may be calculated on the basis of information substantially known to the manufacturer of the espresso coffee machine, the volume above the coffee powder puck varies with a variation in the amount of coffee powder used and/or the grinding fineness set by the user and/or the pressing performed by the user. This volume may vary from about 2.5 $cm^3$ to about 10 $cm^3$. It is clear that such a volume of water may influence significantly the degree of concentration of the espresso coffee obtained. For the same amount of water supplied, when the volume upstream of the coffee puck is small, the espresso coffee will have a greater amount of solvent available, whereas when the volume upstream of the coffee puck is large, the espresso coffee will have a smaller amount of solvent available. Expressed in other words, for the same amount of water supplied, if a small part thereof is used to fill the volume upstream of the coffee puck, a larger part will be used for the beverage; if, on the other hand, a large part thereof is used to fill the volume upstream of the coffee puck, a smaller part will be used for the beverage. In reality, the concentration of the espresso coffee depends not only on the amount of water, but also on the amount of powder.

As mentioned above WO 20111140582 describes an improved method and apparatus for an espresso coffee machine. WO 2011/140582 describes an espresso coffee machine comprising a module for changing the power of the pump, so as to provide a pre-infusion. The module for changing the pump power may be used to define the pressure profile during an espresso coffee production cycle. According to WO 2011/140582, the pressure profile may be pre-set or configured by the user. The pressure profile may assume the form of a power-time profile indicative of the electric power supplied to a respective pump. The Applicant has understood that this approach is not entirely effective since a pre-set pressure profile is a compromise and does not take into account the real conditions of the ground coffee puck. For example, a pre-set profile does not take into account at least one of the following: the actual amount of ground coffee in the filter, the pressure of the ground coffee inside the filter, the average particle size of the ground coffee and the water left in the circuit compared to the previous cycle. Similar considerations are valid for a pressure profile which can be configured by the user since the user may have a partial and not completely precise idea of the amount of ground coffee in the filter and the water left in the water circuit.

EP3225141 discloses a method for operating a coffee machine, in particular a coffee machine which includes an incorporated coffee grinder with an infusion chamber formed in an infusion cylinder which is axially delimited by a piston arranged displaceably inside the infusion cylinder. The Applicant has defined the aim of providing an espresso coffee machine which is able to generate espresso coffee with a set concentration which is less dependent on the amount of coffee powder used and/or the grinding fineness set by the user and/or the pressing performed by the user.

According to the present invention a variation in the value of a parameter indicative of filling of the empty space upstream of the coffee powder puck is detected. This filling parameter is taken into account for the following pre-infusion step and the actual extraction step. In other words, according to the present invention, the infusion step does not start from the moment the pressurized hot water starts to flow from the coffee boiler, but from when the circuit and the empty space upstream of the coffee powder puck are full of water. The water used to fill the circuit and the aforementioned empty space is not taken into account to calculate the degree of concentration.

The filling parameter may comprise a variation in the pressure, a variation in the flow, a variation of the mass or any other combination of these parameters.

According to a first aspect, a machine for the preparation and dispensing of espresso coffee is provided, said machine comprising: a coffee boiler, a filter holder with a filter for a pressed coffee powder puck, a pre-infusion chamber and a hydraulic circuit for transporting pressurized water from said coffee boiler to the pre-infusion chamber, wherein said machine further comprises a device for detecting a variation in the value of a parameter indicative of the filling of said pre-infusion chamber and of said hydraulic circuit so that the step of dispensing an espresso coffee can be started on the basis of said detected variation in the value of said filling parameter.

According to embodiments, the device for detecting a variation in the value of the value of a parameter indicative of the filling of said pre-infusion chamber and of said hydraulic circuit comprises a flowmeter. For example, the flowmeter is configured to detect a slowing of the water flow. In turn, the slowing of the water flow is indicative of the filling of said pre-infusion chamber and of said hydraulic circuit. In fact, the water flow towards the pressed coffee puck is free and substantially unimpeded until the water comes into contact with the coffee puck which creates a resistance and causes a slowing of the water flow.

According to other embodiments, the device for detecting a variation in the value of the a parameter indicative of the filling of said pre-infusion chamber and of said hydraulic circuit comprises a pressure transducer. For example, the pressure transducer is configured to detect a pressure difference of the water. In turn, the pressure difference of the water is indicative of the filling of said pre-infusion chamber and of said hydraulic circuit. In fact, as already mentioned above, the water flow towards the pressed coffee puck is free and substantially unimpeded until the water comes into contact with the coffee puck which creates a resistance and causes a pressure difference of the water.

According to other embodiments, the device for detecting a variation in the value of a parameter indicative of the filling of said pre-infusion chamber and of said hydraulic circuit comprises a weighing device. For example, the weighing device is configured to detect a weight or mass variation of a container for collecting the dispensed espresso coffee. For as long as the espresso coffee does not flow into the container, the weight of the container remains unvaried. When the beverage starts to flow into the container, the water supplied has filled the pre-infusion chamber and the hydraulic circuit and has moistened the coffee puck. Therefore, the water dispensed before the espresso coffee reaches the cup is filling water and may not be considered for the calculation of the brew ratio.

According to another aspect, the present invention provides a process for preparing an espresso coffee with an espresso machine, the machine comprising a coffee boiler, a filter holder with a filter for a pressed coffee powder puck, a pre-infusion chamber and a hydraulic circuit for transporting pressurized water from said coffee boiler to the pre-infusion chamber, the process comprising detecting a variation in the value of a parameter indicative of the filling of said pre-infusion chamber and of said hydraulic circuit and dispensing espresso coffee on the basis of said detected variation in the value of said detected filling parameter.

The filling parameter may comprise a variation of at least one of the following: a parameter indicative of the water flow, a parameter indicative of a water pressure and a parameter indicative of a weight or mass of the espresso coffee dispensed in a container.

The variation in value of the filling parameter may comprise a slowing of the water flow or a pressure difference or a mass or weight variation.

BRIEF DESCRIPTION OF THE FIGURES

There now follows a detailed description of the present invention, provided by way of a non-limiting example, to be read with reference to the accompanying figures, in which:

FIG. 10 show the connection between a detection device and a processing device.

DETAILED DESCRIPTION

Figure 1:
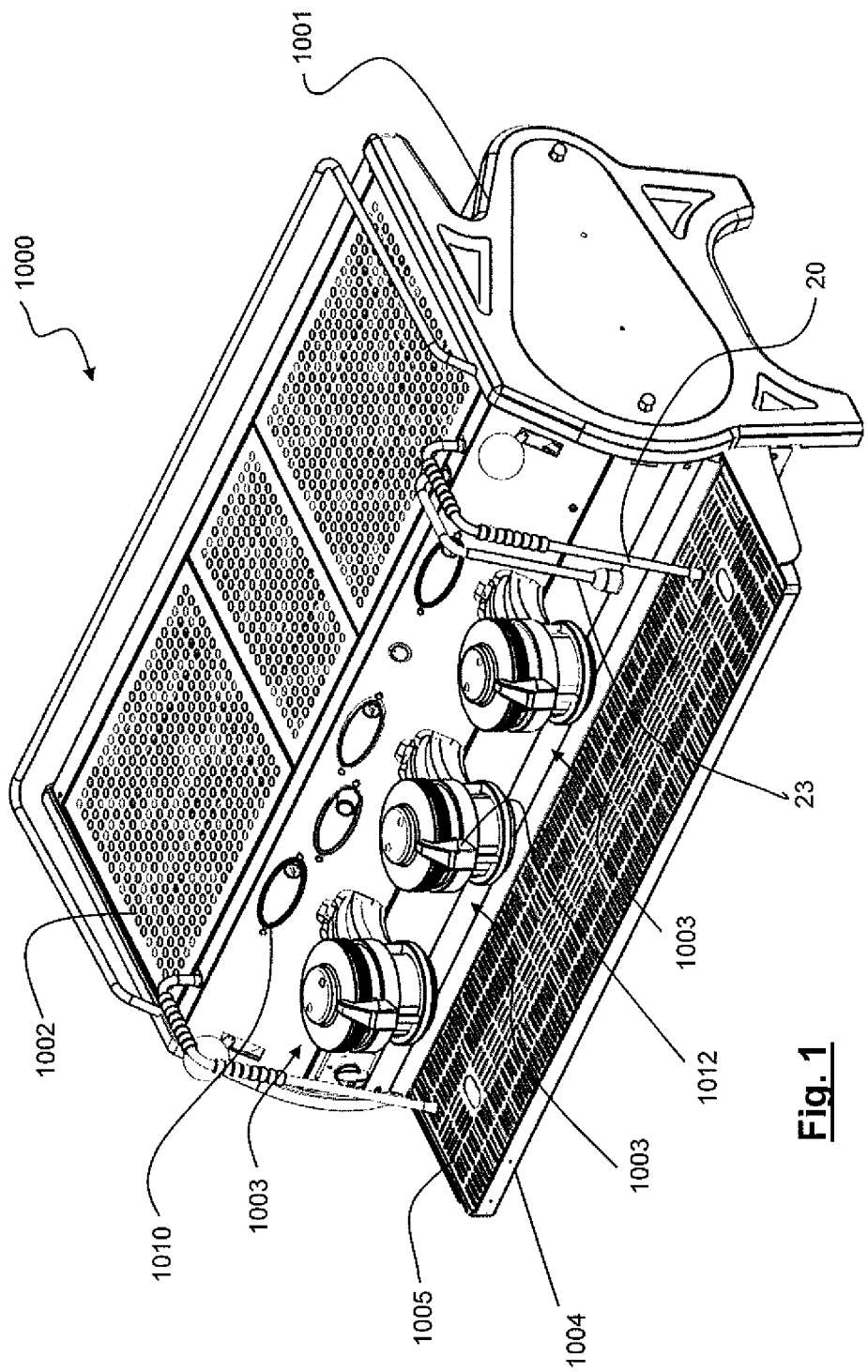
FIG. 1 is an axonometric view of an example of an espresso coffee machine in which the present invention may be incorporated.

FIG. 1 shows, purely by way of example, an espresso coffee machine denoted overall by the reference number

1000. The machine 1000 comprises a substantially closed machine body 1001 which houses the main components of the machine, some of which will be described below. At the top, preferably, the machine 1000 comprises a surface 1002 on which the cups can be placed. An electrical resistance (not shown) or other heating system for heating the cups on the surface 1002 may also be provided.

The machine 1000 comprises at least one dispensing group 1003 for dispensing espresso coffee. Preferably, the machine 1000 comprises several dispensing groups 1003, for example three groups, like the machine shown by way of example in FIG. 1. There could also be two, four or more dispensing groups. A drip tray 1004, which is preferably partially closed at the top by a grid 1005, is preferably present underneath the dispensing groups 1003. Typically the coffee cups are placed on the grid 1005 during dispensing of the espresso coffee.

A filter holder for supporting a filter for a coffee powder puck may be removably connected to each dispensing group 1003.

The machine 1000 may comprise one or more displays 1010 and pushbuttons, for example for switching on/off the machine and/or for starting/ending dispensing.

The machine 1000 shown in FIG. 1 also comprises, for each dispensing group 1003, a lever 1112 for starting/ending dispensing of the espresso coffee and/or for modifying the dispensing pressure during dispensing of the espresso coffee.

Before describing in detail the hydraulic diagram shown in FIGS. 2 and 3, the various reference numbers used, together with a short description of the single components, are indicated below.

1 COFFEE BOILER
10 PUMP
11 EXPANSION VALVE
12 CHECK VALVE
13 PRE-HEATER MIXING VALVE
14 STEAM BOILER
15 DECOMPRESSION VALVE
16 FLOWMETER (VOLUMETRIC METER)
18 BALL TAP
19 STEAM ELECTROVALVE
20 STEAM WAND
21 HOT WATER MIXING VALVE
22 STEAM BOILER FILLING ELECTROVALVE
23 HOT WATER WAND
24 PRESSURE TRANSDUCER
25 STEAM BOILER PRESSURE GAUGE
26 DRAINAGE WELL
27 GEAR PUMP
28 SAFETY VALVE
29 WEIGHING SYSTEM

Figure 2:
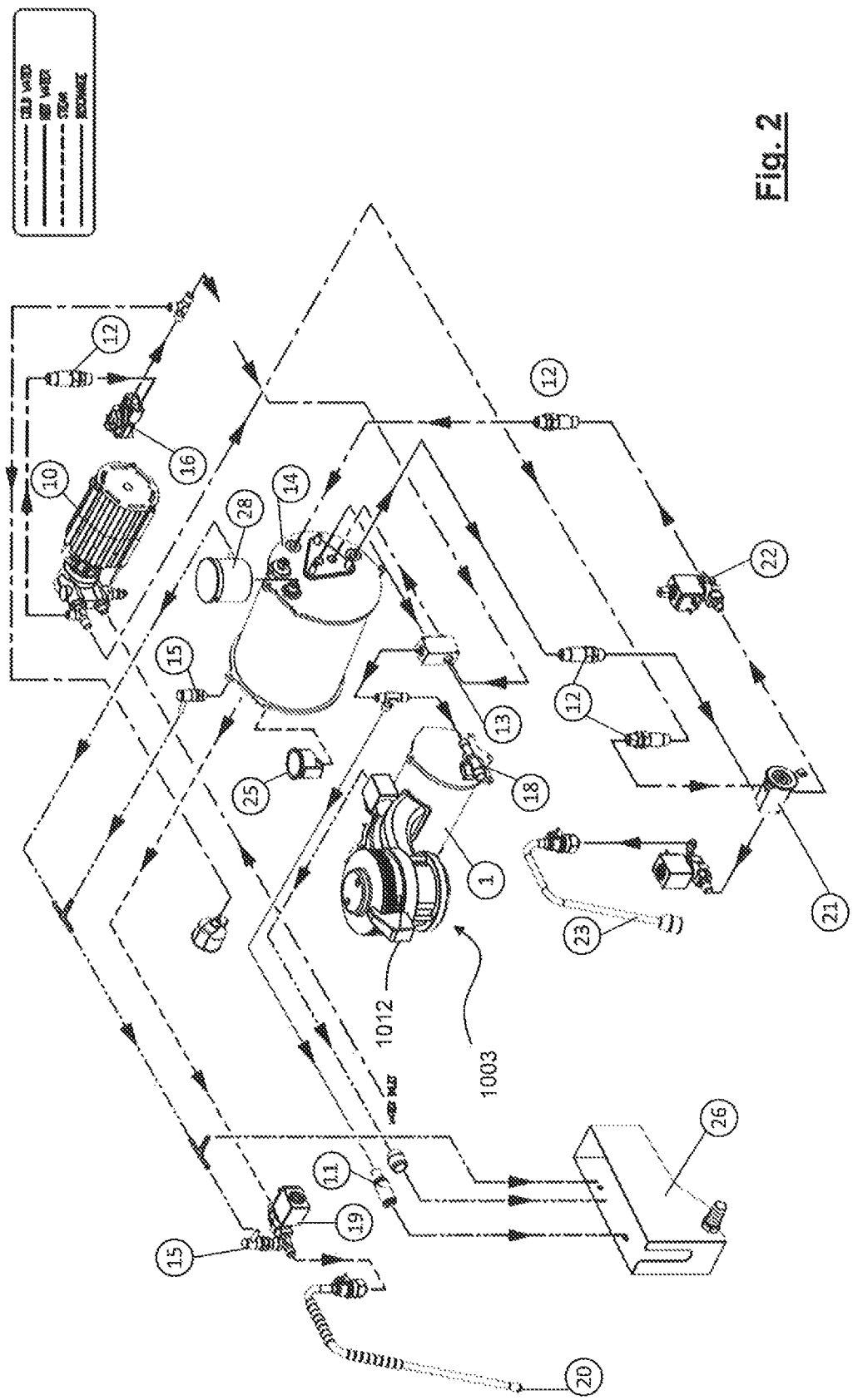
FIG. 2 is a first embodiment of a hydraulic circuit diagram of an espresso coffee machine according to the present invention.
Figure 3:
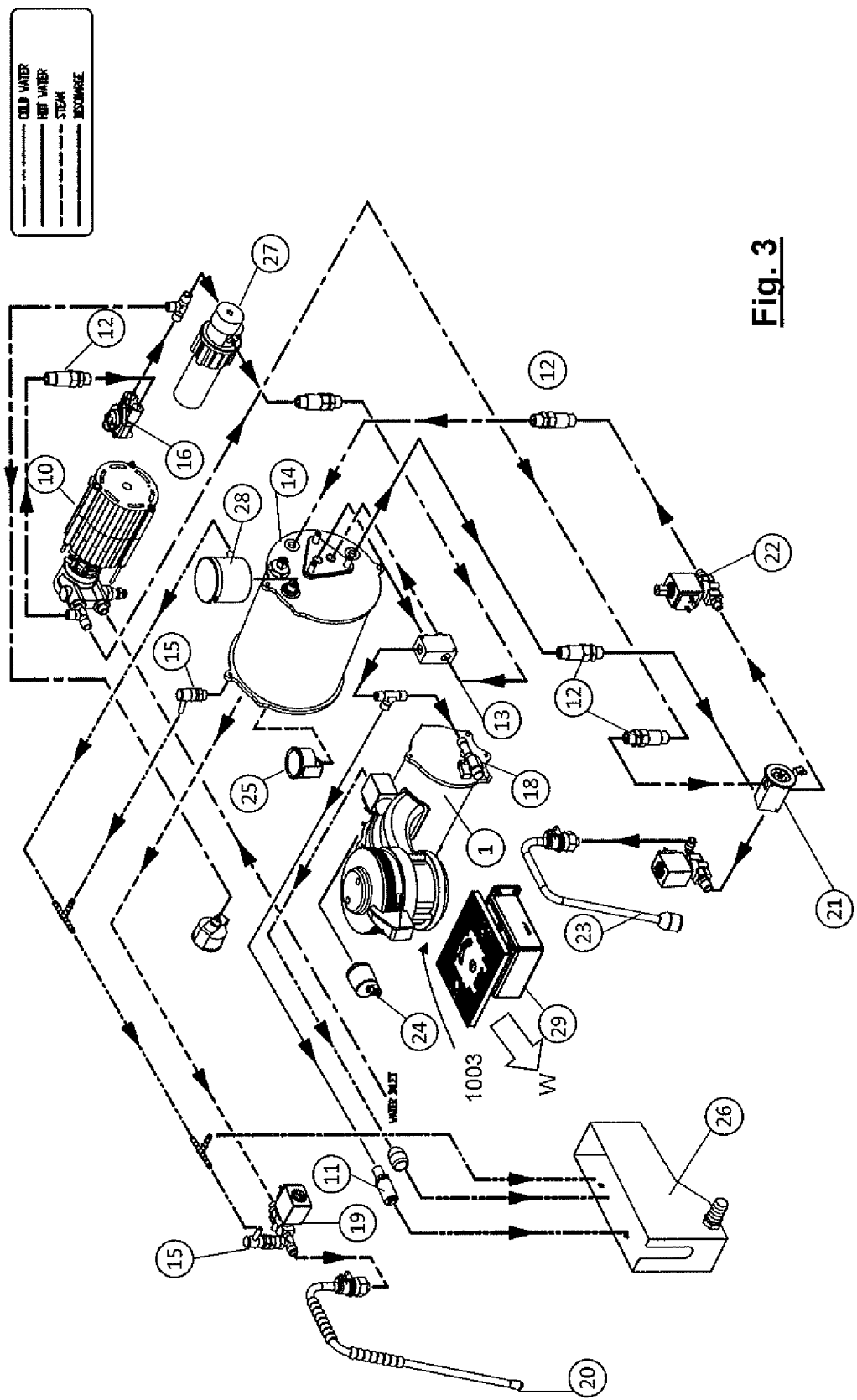
FIG. 3 is a second embodiment of a hydraulic circuit diagram of an espresso coffee machine according to the present invention.

In FIGS. 2 and 3 the following symbol system has been used: the cold water flow is indicated graphically by a "long dash-single short dash-long dash" line; the hot water flow is indicated graphically by a continuous line, the steam flow is indicated graphically by a broken line and, finally, the discharge water flow is indicated graphically by a "long dash-short double dash-long dash" line.

Briefly, in the exemplary diagram shown in FIG. 2, the cold water from the mains (or from any other source) is supplied to the pump 10. The pump 10 supplies the water to the steam boiler 14, preferably passing through the non-return valve 12 and the preheater mixing valve 13.

Preferably, the steam wand 20 is connected to the steam boiler 14 so as to dispense steam and, for example, foam the milk for making a cappuccino.

Preferably, the steam boiler 14 is in fluid communication with the hot water wand 23 in order to supply hot water for preparing infusions (tea or tisanes, for example).

Figure 4:
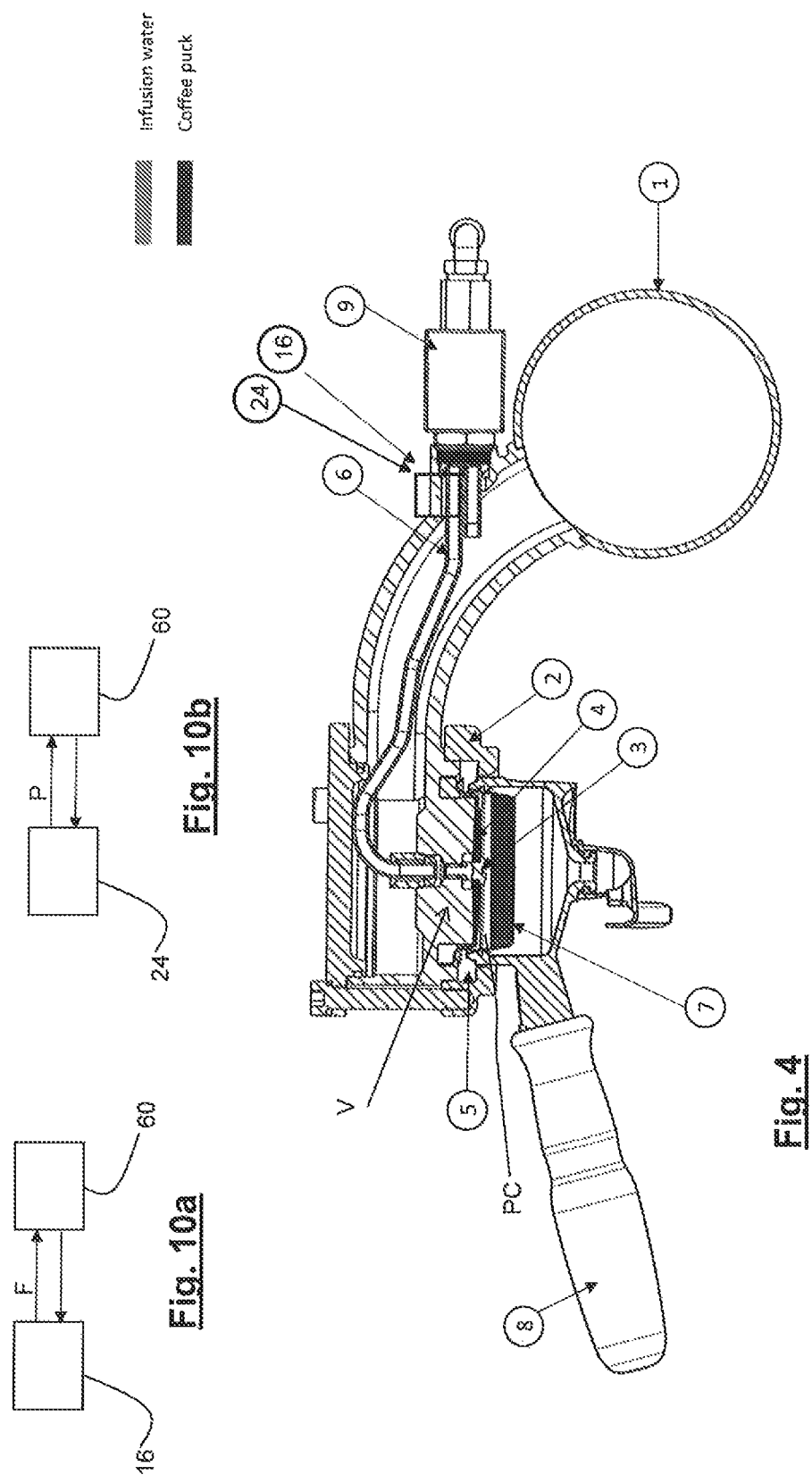
FIG. 4 is a cross-section through the coffee boiler and a filter holder without water.

As shown in FIG. 4, the water from the coffee boiler 1 is conveyed to the dispensing group 1003 by means of an infusion electrovalve 9 and an infusion water pipe 6. In particular, the water from the pipe 6 preferably reaches a shower screen 4 by means of which it is distributed substantially uniformly over a coffee powder puck contained inside a filter 7 supported by the filter holder 8. The coffee powder puck comprises ground coffee which has been pressed by the barman before the filter holder is engaged with the bottom part of the dispensing group 1003.

Preferably, the infusion electrovalve 9 is a three-way valve. The infusion electrovalve 9 comprises a first path for drawing infusion water from the coffee boiler 1, a second path connected to the infusion water supply pipe 6 and a third path for connecting the infusion zone to the discharge outlet.

The infusion water supply pipe 6 is preferably in fluid communication with a diffuser screw 3 and with the shower screen 4.

Figure 5:
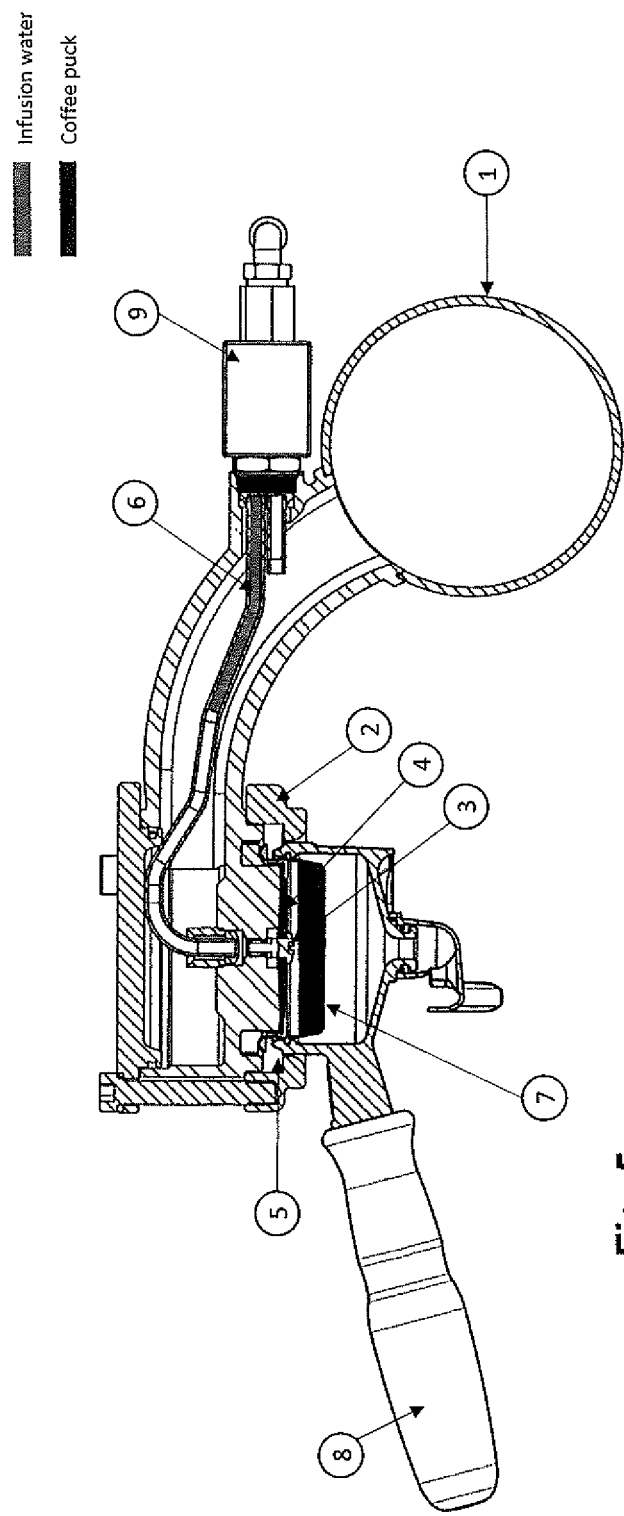
FIG. 5 shows the same components as in FIG. 4 with a first amount of water in the circuit leading to the coffee powder puck.
Figure 6:
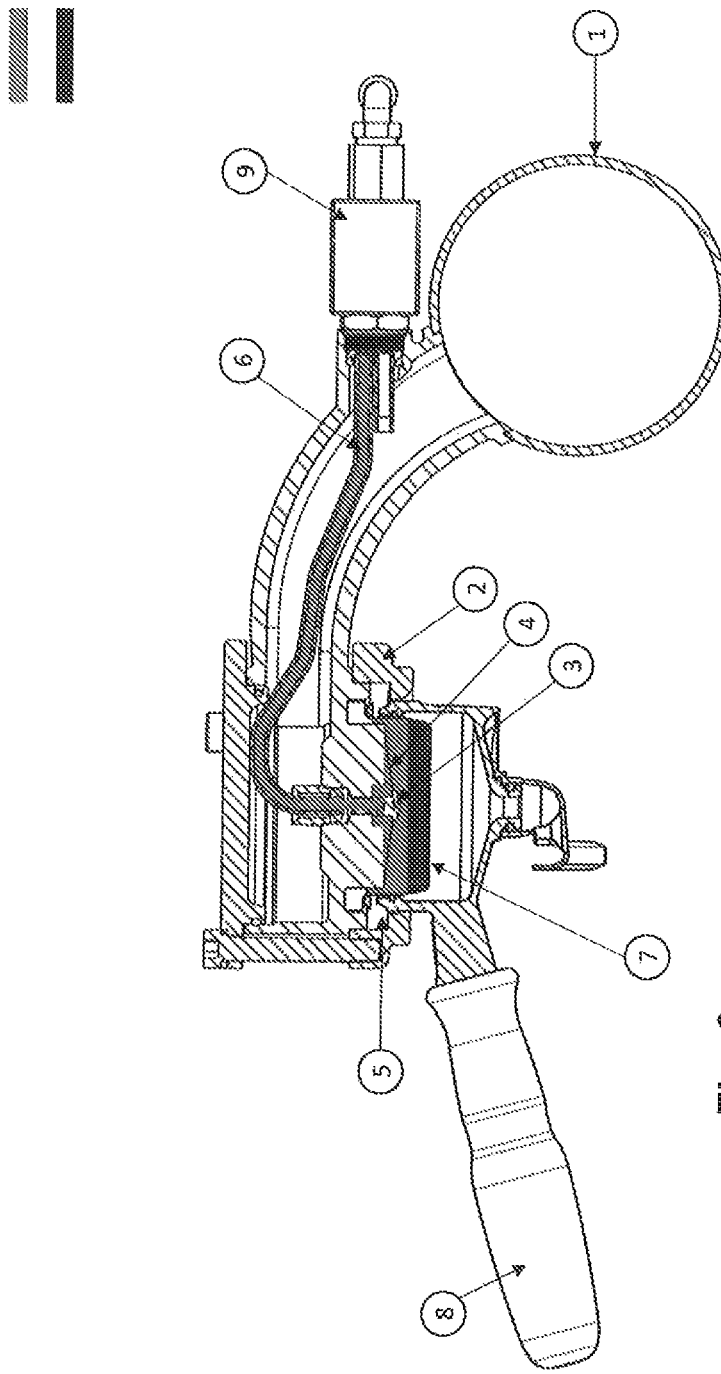
FIG. 6 shows the same components as in FIG. 4 with the water which fills completely the circuit and all the space above the coffee puck.

During use, when a user wishes to prepare an espresso coffee, he/she presses a button (or starts the extraction process in some other way). The infusion water is drawn via the take-off pipe of the infusion electrovalve 9 of the coffee boiler 1 and is directed towards the coffee puck via the infusion water supply pipe 6. The pressurized water starts to flow into the infusion water supply pipe 6 (FIG. 5) until it is completely filled. Then, the pressurized hot water flows into the empty space above the coffee puck.

The expression "empty space above the coffee powder puck" (or similar expressions) is understood as meaning in the present description and in the claims a space (or volume) which, before preparation of an espresso coffee starts, is not filled with water. This space or volume is bounded at the bottom by the coffee powder puck and at the top by the coffee boiler. Typically this empty space comprises a pre-infusion chamber, an infusion electrovalve and a pipe for supplying infusion water. The term "pre-infusion chamber" is understood as meaning a chamber bounded at the bottom by the upper surface of the coffee puck, laterally by the upper portion of the side wall of the filter which contains the coffee puck and, at the top, by the bottom surface of the dispensing group. Below, this empty space will be indicated by the letter "V".

The espresso coffee machine according to the present invention is able to estimate, directly or indirectly, the volume of this empty space above the coffee puck and not intended for the infusion.

The main aim of the machine according to the present invention is that of ensuring repeatability and uniformity of the amount of water which passes through the coffee puck during preparation of the infusion. In order to be able to achieve this result it is necessary to define the amount of water which will be used to fill the empty space upstream of the coffee puck before starting the extraction step. The machine according to the present invention is configured to determine, for each coffee infusion, the amount of water which passes through the puck, assessing how much of the total water dispensed is used to fill the empty spaces.

According to a first embodiment, the machine comprises a volumetric meter (flowmeter) 16 connected to a control unit (CPU) 60 of the machine 1000 (FIG. 10*a*). Preferably, the flowmeter 16 is arranged immediately downstream of the infusion electrovalve 9. Alternatively, the flowmeter 16 could be arranged in another position, further downstream or upstream of the infusion electrovalve 9. The connection between the flowmeter 16 and the control and/or processing unit 60 may be performed by cable or wirelessly.

According to the present invention, a slowing of the flow detected by the flowmeter 16 is indicative of filling of the empty space V above the coffee puck. In other words, when a user starts dispensing a dose of espresso coffee, the pressurized water starts to flow freely inside the infusion water supply pipe 6 until the empty space V above the coffee puck is filled. Once this entire volume V has been filled, the pressurized water flow slows down because it encounters the resistance of the coffee puck. This resistance is detected by the flowmeter 16, typically owing to the fact that the flowmeter 16 suddenly reduces its speed of rotation.

By determining the instant when slowing down occurs it is possible to calculate the amount of water used to fill the empty space V above the coffee puck and start to calculate the real amount of water which will be used for the infusion and therefore determine the end of the pre-infusion step.

According to a second embodiment, the machine comprises a pressure transducer 24 connected to a control unit (CPU) 60 of the machine. Preferably, the pressure transducer 24 is arranged in the vicinity of the dispensing group, in fluid communication with the coffee 30 boiler (FIGS. 3 and 10*b*). It could also be in the same position as the flowmeter 16. The connection between the pressure transducer 24 and the control and/or processing unit 60 may be by cable or wirelessly.

According to the present invention an increase in pressure detected by the pressure transducer 24 is indicative of filling of the empty space above the coffee puck and infusion water supply pipe 6. In other words, when a user starts dispensing a dose of espresso coffee, the pressurized hot water starts to flow freely inside the infusion water supply pipe 6 until the empty space V above the coffee puck is filled. Once this entire volume is filled, the pressure inside the empty space above the coffee puck increases up to a dispensing value. Then the pressurized water starts to pass through the coffee puck and the pressure detected by the pressure transducer 16 is the dispensing pressure generated by the pump 10. The dispensing pressure value could be set as a variable pressure profile during the said dispensing process.

By determining the instant when the increase in pressure occurs it is possible to calculate the amount of water used to fill the pipes above the coffee puck and start to calculate the amount of water used for the infusion and therefore determine the end of the pre-infusion step.

According to a third embodiment, the machine 1000 comprises means 29 (FIG. 3) for detecting the variation in weight or mass of the beverage inside the cup (or other container) situated underneath the dispensing group 1003 of the espresso coffee machine 1000. A variation in weight or mass of the beverage inside the cup is indicative of filling of the empty space above the coffee powder puck. In other words, when a user starts dispensing a dose of espresso coffee, the pressurized hot water starts to flow freely inside the infusion water supply pipe 6 until the empty space V above the coffee puck is filled. Once all this volume has been filled, the pressurized water starts to pass through the coffee powder puck and falls into the cup underneath the dispensing group. The instant when the variation in weight or mass occurs is the instant from which the machine is able to define the amount of water used for the infusion and therefore determine the end of the pre-infusion step.

Preferably, the weighing unit 29 is connected to the control and/or processing unit 60 by cable or wirelessly.

Obviously, two or more of the aforementioned embodiments could be combined to ensure better precision when determining filling of the empty space above the coffee puck and, consequently, the start the start of the flow of pressurized water for the actual extraction process.

For example, according to another embodiment, a pressure transducer associated with a flowmeter could be provided. If two or mare devices indicating filling are combined, the control unit of the machine is programmed to manage the two values (pressure and flow values in this case) and identify a single end-of-filling instant (end of pre-infusion and start of dispensing).

According to embodiments, the value of the parameter indicative of filling of the empty space above the coffee puck may be used for the dispensing operation in progress and/or for subsequent dispensing operations with a self-learning mechanism to improve the detection precision and/or speed.

Figure 7:
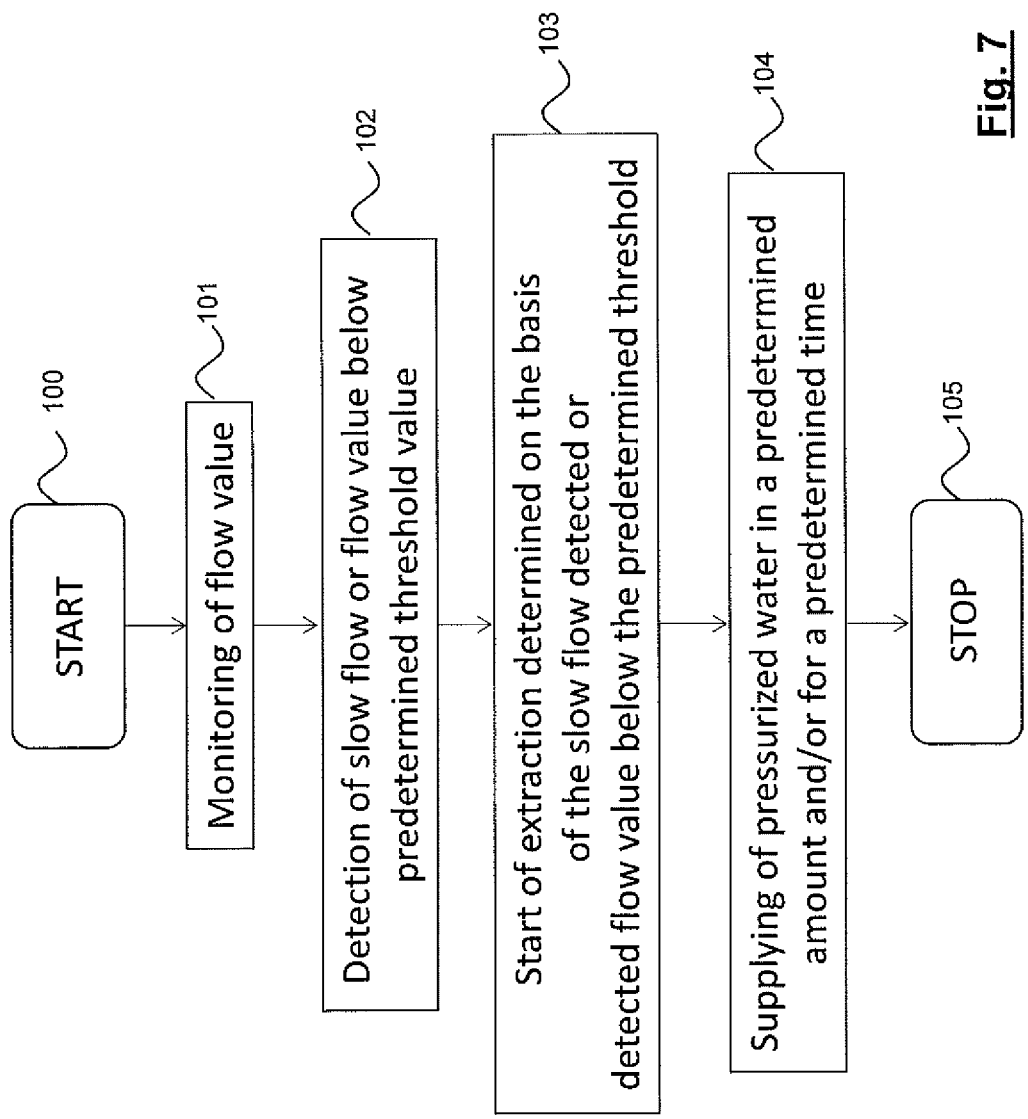
FIGS. 7-9 are three different flow diagrams of three variants of the method according to the present invention.
Figure 8:
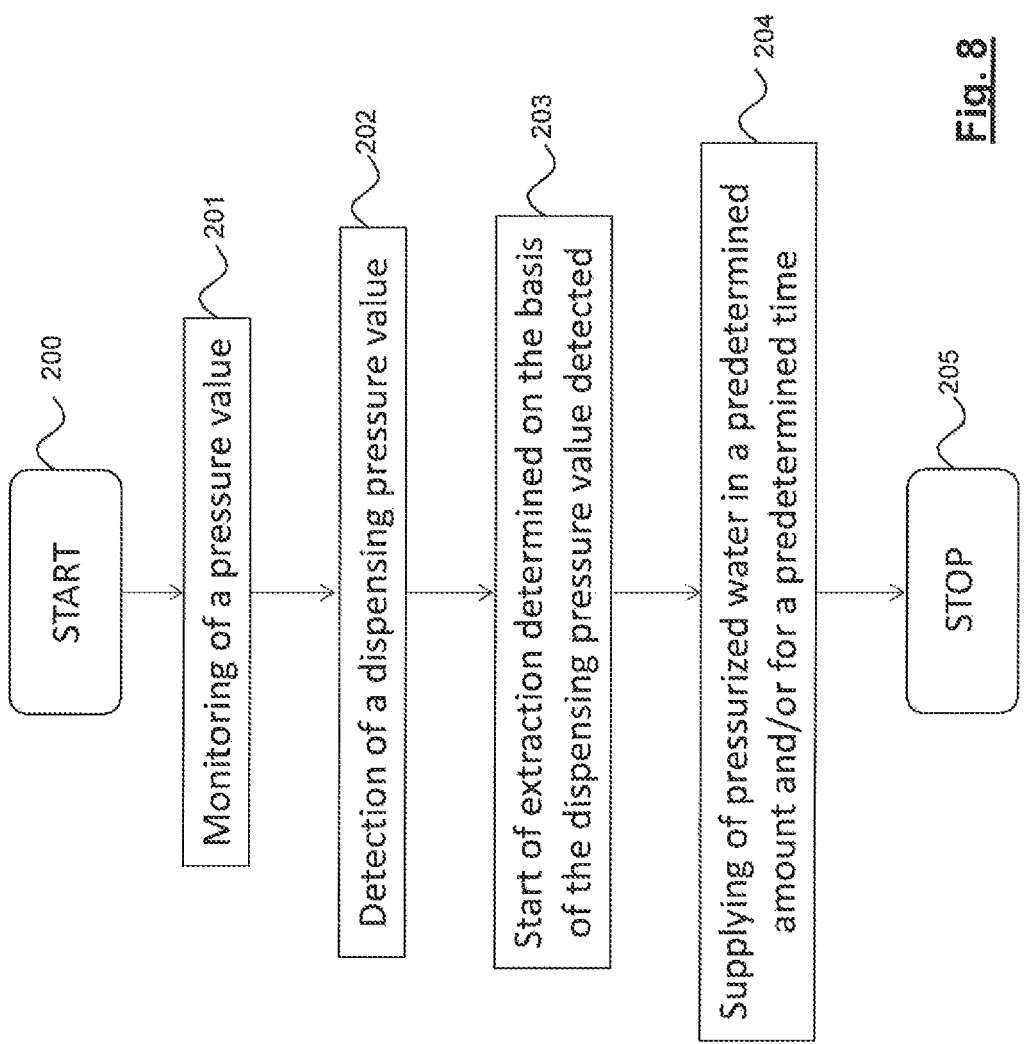
Figure 9:
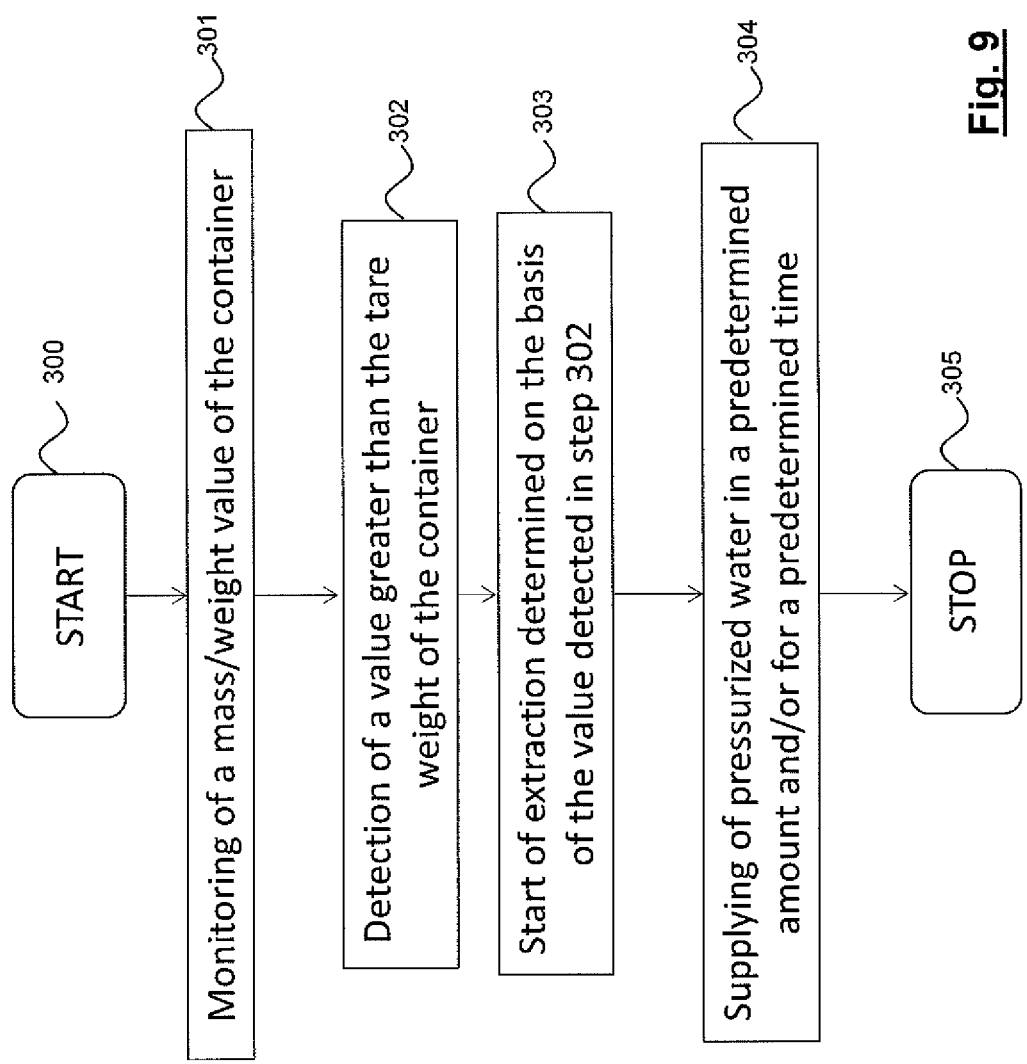

FIGS. 7, 8 and 9 show three different flow diagrams relating to the method according to the three main embodiments.

The flow diagram in FIG. 7 relates to the first embodiment in which the parameter indicative of filling of the empty space above the coffee puck is a flow parameter.

The method envisages, after starting (100) dispensing of an espresso coffee (single, double, etc.), monitoring (101) a flow value, for example by means of a flowmeter 16 or the like. This is followed by detection (202) of slowing of the flow or a flow value below a predetermined threshold considered to be indicative of the fact that complete filling of the empty space above the coffee powder puck has occurred. From the moment complete filling of the empty space above the coffee powder puck is identified, pressurized water is dispensed (104) in a predetermined amount and/or for a predetermined time with the aim of obtaining a desired amount of espresso coffee in the cup. The pressure of the hot water dispensed before the instant indicative of filling of the empty space may be less than the pressure after this instant. The desired amount of espresso coffee in the cup may depend on the amount of powder used, so as to obtain a desired brew ratio (dilution ratio between water and coffee powder), or on other requirements, for example the weight and/or volume.

The flow diagram in FIG. 8 relates to the second embodiment in which the parameter indicative of filling of the empty space above the coffee puck is a pressure parameter.

The method envisages, after starting (200) dispensing of an espresso coffee (single, double, etc.), monitoring (201) a pressure value, for example by means of a pressure transducer 24 or the like. This is followed by detection (202) of a dispensing pressure value or in any case a value above a predetermined threshold considered to be indicative (203) of the fact that compete filling of the empty space above the coffee powder puck has occurred. From the moment complete filling of the empty space above the coffee powder puck is identified, pressurized water is dispensed (204) in a predetermined amount and/or for a predetermined time with the aim of obtaining a desired amount of espresso coffee in the cup. The pressure of the hot water dispensed before the instant indicative of filling of the empty space may be less than the pressure after this instant. The desired amount of espresso coffee in the cup may depend on the amount of powder used, so as to obtain a desired brew ratio (dilution ratio between water and coffee powder), or on other requirements, for example the weight and/or volume.

The flow diagram in FIG. 9 relates to the third embodiment in which the parameter indicative of filling of the empty space above the coffee puck is a weight or mass parameter.

The method envisages, after starting (300) dispensing of an espresso coffee (single, double, etc.), monitoring (301) a mass or weight value of a container inside which the beverage will be collected. For example it is possible to use a weighing device 29. A mass or weight value greater than that of the empty container (tare weight) is then detected (302). This value is considered to be indicative of the fact that complete filling of the empty space above the coffee powder puck has occurred and that a part of the beverage has started to collect inside the container (cup). From the moment complete filling of the empty space above the coffee powder puck is identified, pressurized water is dispensed (304) in a predetermined amount and/or for a predetermined time with the aim of obtaining a desired amount of espresso coffee in the cup. The pressure of the hot water dispensed before the instant indicative of filling of the empty space may be less than the pressure after this instant. The desired amount of espresso coffee in the cup may depend on the amount of powder used, so as to obtain a desired brew ratio (dilution ratio between water and coffee powder), or on other requirements, for example the weight and/or volume.

The invention claimed is:

1. A machine for the preparation and dispensing of an espresso coffee comprising:
    a coffee boiler,
    a filter holder comprising a filter for a pressed coffee powder puck,
    a pre-infusion chamber,
    a hydraulic circuit for transporting pressurized water from the coffee boiler to the pre-infusion chamber, and
    a flowmeter which is arranged in the hydraulic circuit and which is configured to detect a slowing of the water flow, wherein the slowing of the water flow is indicative of filing of the pre-infusion chamber and of the hydraulic circuit, so that dispensing the espresso coffee can be started on the basis of the detected slowing of the water flow.

2. A machine for the preparation and dispensing of an espresso coffee comprising:
    a coffee boiler,
    a filter holder comprising a filter for a pressed coffee powder puck,
    a pre-infusion chamber,
    a hydraulic circuit for transporting pressurized water from the coffee boiler to the pre-infusion chamber, and
    a pressure transducer which is arranged in the hydraulic circuit and which is configured to detect an increase of water pressure, wherein the increase of water pressure is indicative of filling of said pre-infusion chamber and of said hydraulic circuit, so that dispensing the espresso coffee can be started on the basis of the detected pressure difference of the water flow.

3. A machine for the preparation and dispensing of an espresso coffee comprising:
    a coffee boiler,
    a filter holder comprising a filter for a pressed coffee powder puck,
    a pre-infusion chamber,
    a hydraulic circuit for transporting pressurized water from the coffee boiler to the pre-infusion chamber, and
    a weighing device which is configured to detect a weight or mass variation of a container for collecting the dispensed espresso coffee, wherein said weight or mass variation is indicative of filling of said pre-infusion chamber and of said hydraulic circuit, so that dispensing the espresso coffee can be started on the basis of the detected pressure difference of the water flow.

4. A process for preparing an espresso coffee with an espresso coffee machine, the espresso machine comprising a coffee boiler, a filter holder comprising a filter for a pressed coffee powder puck, a pre-infusion chamber, and a hydraulic circuit for transporting pressurized water from the coffee boiler to the pre-infusion chamber, the process comprising:
    starting a pre-infusion step:
    detecting a variation in a value of a parameter indicative of filling of said pre-infusion chamber and of said hydraulic circuit;
    terminating the pre-infusion step on the basis of said detected parameter variation, wherein said parameter variation comprises a variation of at least one of:
        (i) a slowing of the water flow detected by a flowmeter which is arranged in the hydraulic circuit,
        (ii) an increase of water pressure detected by a pressure transducer which is arranged in the hydraulic circuit,
        (iii) a variation of the weigh or mass of a container for collecting the dispensed espresso coffee, wherein the weight or mass variation is detected by a weighing device.

5. The process of claim 4, further comprising:
    carrying-out an infusion step after the pre-infusion step and thereby obtaining the espresso coffee at the end of the infusion step.

6. The process of claim 5, further comprising:
    preparing a further espresso coffee, including starting a further pre-infusion step, terminating the further pre-infusion step on the basis of said pre-infusion step, carrying-out a further infusion step after the further pre-infusion step, and thereby obtaining the further espresso coffee.

7. The process of claim 5, comprising calculating a degree of concentration of the espresso coffee based on the amount of water supplied during the infusion step.

8. A machine for the preparation and dispensing of an espresso coffee comprising:
    a coffee boiler,
    a filter holder comprising a filter for a pressed coffee powder puck,
    a pre-infusion chamber,
    a hydraulic circuit for transporting pressurized water from the coffee boiler to the pre-infusion chamber,
    a sensor which is arranged in the hydraulic circuit and which is configured to sense a parameter indicative of filling of the pre-infusion chamber and of the hydraulic circuit, and,
    processing circuitry connected to the sensor and configured to control dispensing the espresso coffee so that the dispensing is started on the basis of the sensed parameter.

9. The machine of claim 8, wherein the sensor comprises a flowmeter.

10. The machine of claim 8, wherein the sensor comprises a pressure transducer.

11. The machine of claim 8, wherein the sensor comprises a weighing device.

* * * * *